Aug. 21, 1956 D. R. ANDREWS 2,760,063

MAGNETIC PULSE RECORDING

Filed Dec. 29, 1951

INVENTOR
Dallas R. Andrews
BY Morris A. Rabkin
ATTORNEY

United States Patent Office 2,760,063

Patented Aug. 21, 1956

2,760,063

MAGNETIC PULSE RECORDING

Dallas R. Andrews, Collingswood, N. J., assignor to Radio Corporation of America, a corporation of Delaware Application December 29, 1951, Serial No. 264,147

5 Claims. (Cl. 250—27)

Figure 2:
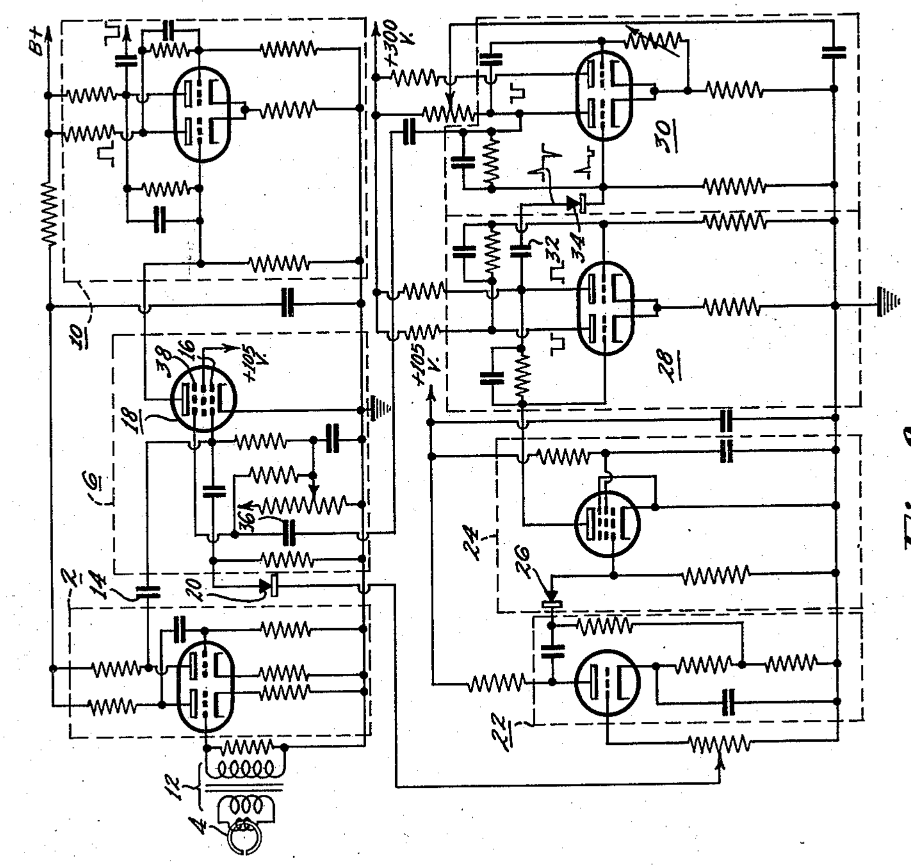

This invention relates to pulse code translation systems, and more particularly to a gating or control means for use in conjunction with such systems.

In the art of computers and automatic accounting machines, there has been a growing demand for equipment which will handle a greater amount of information in a given time. One means by which a higher operating speed may be obtained is by using magnetically recorded data. Among the various devices used for the storage of such magnetic records there are discs, drums, and tapes. Although applicable to the other devices, the present invention is probably best suited for use with tape records.

When information is to be stored on magnetic records, it is usually converted into a binary digit code. On tape records, the tape is divided, longitudinally, into a number of tracks or channels, each track representing a digit position. When the coded information is applied to the tape, magnetic pulses corresponding to the coded bit of information are applied to the tape in the channels. These pulses are applied substantially simultaneously, and occupy positions presumably in a straight line, transverse of the tape. However, the pulses are not always placed on the tape in a straight line due to slight deformations in the tape, a slight misalignment of the recording heads and the like. Then, too, although the pulses on the tape may be in perfect adjustment, there may be a slight misalignment of the reading heads on the translating equipment. Any of the above mentioned discrepancies will tend to cause the signals detected by associated translating equipment to appear slightly out of phase with each other.

In certain types of translating apparatus, it is important that the signals representing the digits of the code appear simultaneously at the utilization device. One way of achieving this desired result is to record a series of timing pulses in a separate track or channel, detecting each of the timing pulses, and using those detected pulses to gate an amplifier. Those pulses are recorded permanently on the record medium and are not erased during subsequent operations as the data pulses would be. Thus, while such a system would probably work very well on a record medium which is not subject to changes in length, such as a drum, on tape, the length dimensions of which may change under the influence of stress, temperature and humidity changes, the timing pulses may be seriously out of phase with data pulses subsequently recorded thereon. Further, by employing a separate timing track, valuable space is used for that purpose which otherwise could be used for the storage of useful data.

Accordingly, it is an object of the present invention to provide an improved control means for use with pulse coded data translating apparatus.

Another object of the present invention is to provide a control means as set forth wherein a gating control is obtained without the use of an auxiliary timing signal.

It is still another object of the present invention to provide a control means as set forth wherein gating control is obtained from the data signals.

Yet another object of this invention is to provide a control means as set forth which is suitable for use with magnetic tape record storage means.

In accomplishing these and other objects, there has been provided, in accordance with the present invention, a plurality of data pulse detecting means, one for each channel or digit position of the recorded data. Suitable amplifiers are provided for each of the detecting means. A portion of the amplified data pulses from each of the detectors is applied to a corresponding gating means. Another portion of the amplified data pulses from each of the detectors is applied to a single trigger circuit to produce a triggering pulse. The thus produced triggering pulse is applied to each of the gating means simultaneously. Each of the gating devices is so designed that it remains closed or inoperative until a triggering pulse and a data pulse are simultaneously applied thereto, whereupon the gating device is opened or operated. Each of the gating devices is connected to an output circuit which is responsive to the operation of the gating device. Since the phase displacement of the data pulses is very slight, and the trigger pulse is of very short duration and is slightly delayed, the coincidence of the signals from the several output circuits is assured.

Figure 1:
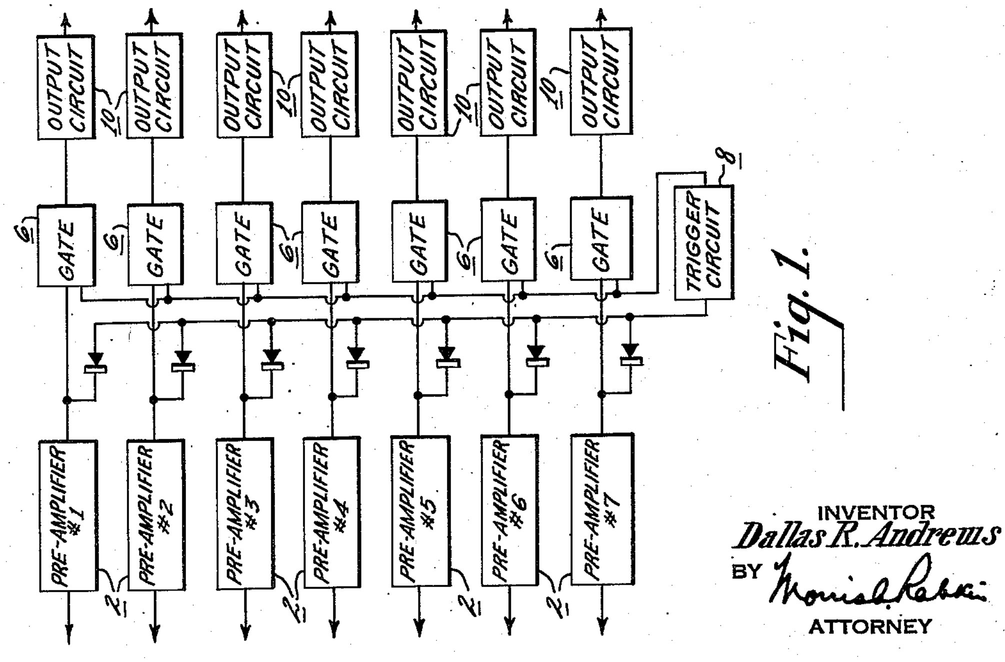

A better understanding of the present invention may be had from the following detailed description when read in connection with the accompanying drawing in which:

Fig. 1 is a schematic diagram of a system according to the present invention, and Fig. 2 is a circuit diagram of a circuit made in accordance with the present invention.

Referring, now, to the drawings in more particularity, in Fig. 1 there is shown a plurality of signal preamplifiers 2 (7 being shown). Each of the preamplifiers is fed from a corresponding data pulse detecting device 4 such as a magnetic record transducer (see Fig. 2). The preamplifiers 2 are directly connected to corresponding gating circuits 6. A portion of each amplified data pulse is tapped off, rectified, and fed to a trigger circuit 8. The trigger circuit is keyed by the pulses fed thereto and, in turn, produces measured triggering pulses. The triggering pulses are applied to all of the gating circuits simultaneously. The gating circuits are such that they remain closed until a triggering pulse and a detected data pulse are applied thereto in coincidence. When such coincident application occurs, the gating circuit momentarily opens, to pass a gated pulse.

Connected to each of the gating circuits there is an output circuit 10. These output circuits are triggered or keyed by the gated pulses from the gating circuits 6 to produce an output pulse.

As previously indicated, data pulses detected from a magnetic tape record may be slightly out of phase, and it is desirable, in many instances, to have the pulses exactly in phase before they are fed to a utilization device. By means of the arrangement just described, this objective may be achieved. Assume that a coded bit of information is represented by a pulse in each of channels number 1, 3 and 5. Further assume that the pulses appearing in channels 1 and 3 are exactly in phase but that the pulse appearing in channel 5 is slightly in advance of the other two. Now the pulses on the tape are substantially square waves, but the transducer is inherently somewhat of a differentiating device. Consequently, the reproduced and amplified pulse will appear as substantially a sine wave with a positive and a negative peak, each with substantial width. When the apparatus is constructed in keeping with standard engineering tolerances, the pulses will never be more than a very small fraction of a cycle out of phase.

Thus, it may be seen that the first data pulse presented to the trigger circuit 8 will key that circuit into operation. The triggering pulse produced by the trigger circuit is a short, measured pulse. That is, its duration or length is dependent upon the time constants of the circuit and not upon the input to the circuit. A slight time delay is introduced in the trigger circuit so that the triggering pulse falls, when superimposed upon data pulses at the gating circuit, not necessarily upon the peak of the first arriving data pulse, but upon the mean peak of all of the detected data pulses. Since the phase displacement of these data pulses will be very slight, the gating circuit may be so biased that, at the time of occurrence of the triggering pulse, any one of the data pulses will be of sufficient instantaneous amplitude to key the gate when joined by the triggering pulse. Neither the data pulses alone nor the triggering pulses alone are sufficient to key the gate.

Although the data pulses may arrive at their respective gates slightly out of phase, they may not pass until the arrival of the triggering pulse. This triggering pulse is applied to all of the gates simultaneously. Therefore, the gates which are to open, will all open in synchronism.

In Fig. 2, there is shown a specific circuit arrangement embodying the present invention wherein but one of the translating channels is shown connected to the trigger circuit. A data pulse detecting device such as the magnetic transducer 4 is connected through a transformer 12 to a preamplifier 2 comprising a two stage amplifier circuit. The output circuit of the preamplifier 2 is connected through a blocking condenser 14 to the control grid 16 of the gating tube 18 around which is built a gating circuit 6.

The output circuit of the preamplifier 2 is also connected to the input circuit of the trigger circuit 8. That portion of the output of the preamplifier 2, the data pulses, which is fed to the trigger circuit 8 is first rectified by a rectifier 20 to eliminate the negative peaks of the detected data pulses. The rectified pulses are then fed to a first amplifier 22, and then to a driver amplifier 24. Between the first amplifier 22 and the driver amplifier 24 there is inserted a biased rectifier 26 which establishes a threshold for the driver amplifier, eliminating low amplitude "noise" fluctuations. The driver amplifier 24 is directly coupled to a first flip-flop circuit 28 which is directly controlled by the driver amplifier. That is, when the amplitude of the signal put out by the driver amplifier reaches a predetermined critical value, the first flip-flop circuit 28 is shifted from its normal state to its energized state, and is held in that condition until the amplitude of the signal from the driver amplifier decreases to a predetermined critical cut-off value. Thus, the output of the first flip-flop circuit is substantially a square wave whose width is determined by the width of the signal put out by the driver amplifier.

The square wave from the first flip-flop circuit 28 is then used to key a second flip-flop circuit 30. However, before the pulse from the first flip-flop circuit, the square wave is first differentiated by a differentiating capacitor 32 and the negative peak of the differentiated wave is removed by a rectifier 34. The second flip-flop circuit 30 is of the type known as a "one-shot" or "slideback" flip-flop. That is, when the circuit is keyed by a pulse from the first flip-flop circuit, it is shifted from its stable state to its unstable state; it then shifts back to its stable state after a period of time determined by its own time constants. Thus, the second flip-flop circuit develops a square wave pulse of energy of a measured or predetermined width.

This pulse of energy, or triggering pulse, developed by the second flip-flop circuit 30 is applied, after being differentiated by a differentiating capacitor 36, to the suppressor grid 38 of the gating tube 18. It should be remembered that, although but one of the gating circuits and one of the output circuits have been shown in Fig. 2, there may be as many of these circuits as there are recording channels on the data record medium, and all of the gating circuits will have the triggering pulse applied simultaneously to their respective suppressor grids. Assuming that the gating tube shown is one which has a data pulse appearing on its control grid 16, the application of the triggering pulse to the suppressor grid 38 will overcome the bias on the tube 18, allowing a signal to pass. The passed signal, or gated pulse, will be an amplification of the positive peak of the differentiated triggering pulse.

The gated pulse is applied to key the output circuit 10. In the illustrated example, the output circuit is shown as a lock-up, flip-flop circuit similar to the first flip-flop circuit of the trigger circuit. The gated pulse shifts the flip-flop from its normal state to its energized state. Then, after a short interval determined by the width of the gated pulse, the flip-flop circuit returns to its normal state. The signal put out by the output circuit 10 is substantially a square wave representative of the data pulse. Here, as previously indicated, the pulses developed by the several output circuits will be in synchronism with each other since they are all keyed by the same triggering pulse.

From the foregoing, it may be seen that, in accordance with the present invention, there has been provided an improved control means for use with pulse coded data translating apparatus wherein gating control is obtained from the data pulses and without the use of an auxiliary timing track.

What is claimed is:

1. In a system for translating pulse coded data recorded in a plurality of channels on a recording medium, the combination comprising a plurality of data pulse detecting means, a trigger circuit, a gating circuit for each of said detecting means, means including rectifying means interconnecting each of said detecting means with said trigger circuit for applying a portion of the detected data pulses to said trigger circuit thereby to produce triggering pulses, means for applying another portion of the detected data pulses to corresponding ones of said gating circuits, means for applying said triggering pulses simultaneously to all of said gating circuits, each of said gating circuits being operable in response to the simultaneous application of a triggering pulse and a detected data pulse thereto, and an output circuit connected to each of said gating circuits, said output circuits being operative in response to the operation of their respectively associated gating circuits to produce pulses in synchronism with each other which are representative of the data pulses.

2. In a system for translating pulse coded data recorded in a plurality of channels on a record medium, the combination comprising a plurality of data pulse detecting means corresponding in number to the recording channels, amplifying means connected to each of said detecting means for amplifying the detected data pulses, a trigger circuit, means including rectifying means for applying a portion of the detected data pulses from each of said amplifying means to said trigger circuit thereby to produce triggering pulses, a gating circuit for each of said detecting means, means for applying another portion of said detected data pulses from each of said amplifying means to corresponding ones of said gating circuits, means for applying said triggering pulses simultaneously to all of said gating circuits, each of said gating circuits being operable in response to the simultaneous application of a triggering pulse and a detected data pulse thereto, and an output circuit connected to each of said gating circuits, said output circuits comprising flip-flop circuits responsive to the operation of corresponding ones of said gating circuits.

3. The invention as set forth in claim 2 wherein said trigger circuit includes a first amplifier, a driver amplifier, a first flip-flop circuit, a second flip-flop circuit, said first flip-flop circuit being directly controlled by said driver amplifier, and differentiating means coupling said first and second flip-flop circuits, said second flip-flop circuit being of the slide-back type.

4. The invention as set forth in claim 3 wherein said data pulse detecting means comprises magnetic record transducers.

5. In a system of the character described, the combination of a plurality of data pulse detecting means for deriving detected data pulses, means for deriving triggering pulses from said detected data pulses, and a plurality of gate means corresponding in number to said data pulse detecting means and respectively coupled thereto, said gating means being responsive to said triggering pulses and said data pulses for producing pulses representative of said detected data pulses, said gating means being connected to be simultaneously triggered by said triggering pulses whereby said produced pulses are in synchronism with each other.

References Cited in the file of this patent

UNITED STATES PATENTS

| | | |
|---|---|---|
| 2,199,634 | Koch | May 7, 1940 |
| 2,478,919 | Hansell | Aug. 16, 1949 |
| 2,533,552 | Brinster et al. | Dec. 12, 1950 |
| 2,540,654 | Cohen et al. | Feb. 6, 1951 |
| 2,545,214 | Schock | Mar. 13, 1951 |
| 2,594,731 | Connolly | Apr. 29, 1952 |
| 2,610,292 | Bond et al. | Sept. 9, 1952 |

FOREIGN PATENTS

| | | |
|---|---|---|
| 635,476 | Great Britain | Dec. 12, 1950 |